United States Patent
Gopinath et al.

(10) Patent No.: US 9,251,537 B2
(45) Date of Patent: Feb. 2, 2016

(54) CUSTOMIZATION OF AN E-COMMERCE DISPLAY FOR A SOCIAL NETWORK PLATFORM

(71) Applicant: International Business Machines Corporation, Armonk, NY (US)

(72) Inventors: Divya Gopinath, Clarksburg, MD (US); Rajesh Radhakrishnan, Reston, VA (US); Jennifer A. Watson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 13/734,458

(22) Filed: Jan. 4, 2013

(65) Prior Publication Data

US 2014/0195387 A1   Jul. 10, 2014

(51) Int. Cl.
*G06Q 30/00* (2012.01)
*G06Q 30/06* (2012.01)
*G06Q 50/00* (2012.01)

(52) U.S. Cl.
CPC ........ *G06Q 30/0641* (2013.01); *G06Q 30/0631* (2013.01); *G06Q 50/01* (2013.01)

(58) Field of Classification Search
CPC ............ G06Q 30/0601–30/0643; G06Q 50/01
See application file for complete search history.

(56) References Cited

U.S. PATENT DOCUMENTS

| | | |
|---|---|---|
| 7,243,105 B2 | 7/2007 | Thint et al. |
| 2010/0142447 A1 | 6/2010 | Schlicht et al. |
| 2010/0318425 A1 | 12/2010 | Karanjia et al. |
| 2011/0178881 A1* | 7/2011 | Pulletikurty ............... 705/14.73 |
| 2011/0276406 A1 | 11/2011 | Sneyders |
| 2012/0030062 A1 | 2/2012 | Stauffer et al. |
| 2012/0054277 A1* | 3/2012 | Gedikian ...................... 709/204 |
| 2012/0123899 A1 | 5/2012 | Wiesner |
| 2012/0190386 A1 | 7/2012 | Anderson |
| 2013/0030937 A1* | 1/2013 | Larguia et al. ............... 705/26.1 |
| 2013/0054692 A1* | 2/2013 | Sabur ............................ 709/204 |
| 2013/0159519 A1* | 6/2013 | Hochberg et al. ............. 709/225 |
| 2013/0297493 A1* | 11/2013 | Linden et al. ................... 705/39 |

OTHER PUBLICATIONS

12 Social Media Marketing Platforms for Ecommerce Marketers. Jan. 12, 2012. Vangie Beal.*

* cited by examiner

*Primary Examiner* — William Allen
(74) *Attorney, Agent, or Firm* — Isaac J. Gooshaw

(57) ABSTRACT

A first computer identifies electronic commerce activity related to a first user. The first computer retrieves a first data, wherein the first data is coupled to the electronic commerce activity. The first computer analyzes the first data and generates a second data. The first computer generates an electronic commerce display for a social network platform using the second data, wherein the electronic commerce display includes at least one timeline of the electronic commerce activity of the first user.

23 Claims, 4 Drawing Sheets

CUSTOMIZATION OF AN E-COMMERCE DISPLAY FOR A SOCIAL NETWORK PLATFORM

FIELD OF THE INVENTION

The present invention relates generally to the field of e-commerce, and more particularly to the customization of a faceted display that includes e-commerce activity for a social network platform.

BACKGROUND OF THE INVENTION

With the wide-spread use of the Internet, electronic commerce (e-commerce) has become embedded in cultures throughout the world. Buying consumer products and services in a marketplace full of choices can often be a tedious task and the shopping process for on-line users can be even more difficult.

The experience that Internet search engines and ecommerce platforms provide can be very different from the experience a consumer would have in a physical store, where the salesman is available for questioning and recommendations. At the same time, social networks such as Facebook™ and MySpace™ and business orientated networking platforms such as LinkedIn™ continue to grow in popularity. Blogging platforms such as Twitter™ provide additional ways for users to keep in touch with friends and family and to make new social contacts worldwide.

Both vendors and advertising companies have begun to leverage social media sites in an effort to increase the sales and revenue related to e-commerce activities. As such, it has become more important for social networking sites to provide interfaces that facilitate e-commerce activity.

SUMMARY

Embodiments of the present invention disclose a method, computer program product, and system for customizing an electronic commerce display included in a social network platform. A first computer identifies electronic commerce activity related to a first user. The first computer retrieves a first data, wherein the first data is coupled to the electronic commerce activity. The first computer generates a second data, wherein the second data is generated by analyzing the first data. The first computer generates an electronic commerce display for a social network platform using the second data, wherein the electronic commerce display includes at least one timeline of the electronic commerce activity of the first user.

DETAILED DESCRIPTION

Figure 1:
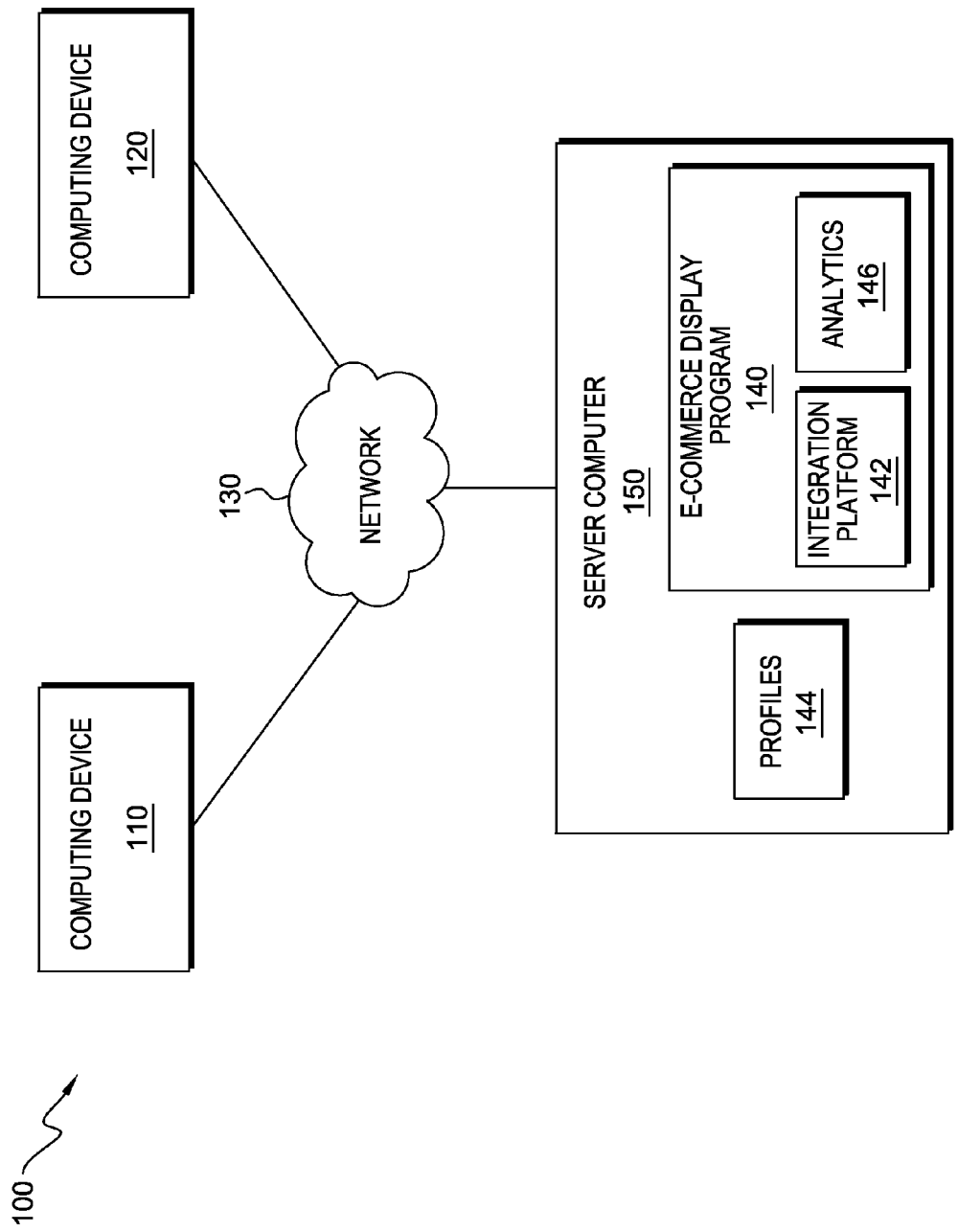
FIG. 1 is a block diagram illustrating an electronic commerce environment, in accordance with an embodiment of the present invention.

Electronic commerce platforms such as eBay™, Overstock.com™, and Amazon.com™ allow retailers easy access to consumers and provide many products that may be selected for purchase by a user at a computer terminal. These websites also allow a user to review a product by typing a statement concerning the product and rating the product using stars. However, such shopping websites do not incentivize recommendations, provide an easy way to recommend a product to a friend, or track those recommendations. Also, an anonymous recommendation can lack the same credibility that a recommendation from a friend may have. A trustworthy feedback or review for a particular item could be difficult to find as such information may be spread out over a number of individual sites with little if any control over who can input material for reviews.

In contrast to shopping websites, social networking websites, such as Facebook™ and Twitter™, provide users the opportunity to select friends and communicate with friends and others. Although, in principle, while a user may make a shopping recommendation to a friend on a social network site, creating a link to the product to include with the recommendation is time consuming and difficult as such social networks sites do not lend themselves to the support of on-line shopping functions. Exemplary embodiments of the present invention provide for a faceted display showing the electronic commerce activity of a given user via a timeline(s). Selected friends, family, and other individuals, can view the information included in the electronic commerce timeline according to privacy settings chosen by the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium is hardware, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or th e like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a block diagram illustrating an electronic commerce (e-commerce) environment, generally designated 100, in accordance with one embodiment of the present invention.

E-commerce environment 100 includes computing device 110, computing device 120, and server computer 150, all connected over network 130. Server computer 150 includes e-commerce display program 140, which further includes integration platform 142, profiles 144, and analytics 146.

In alternative embodiments, e-commerce display program 140, integration platform 142, profiles 144, and analytics 146 may be stored externally to server computer 150 and accessed through network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, computing device 120, and server computer 150 in accordance with an exemplary embodiment of the present invention.

Figure 4:
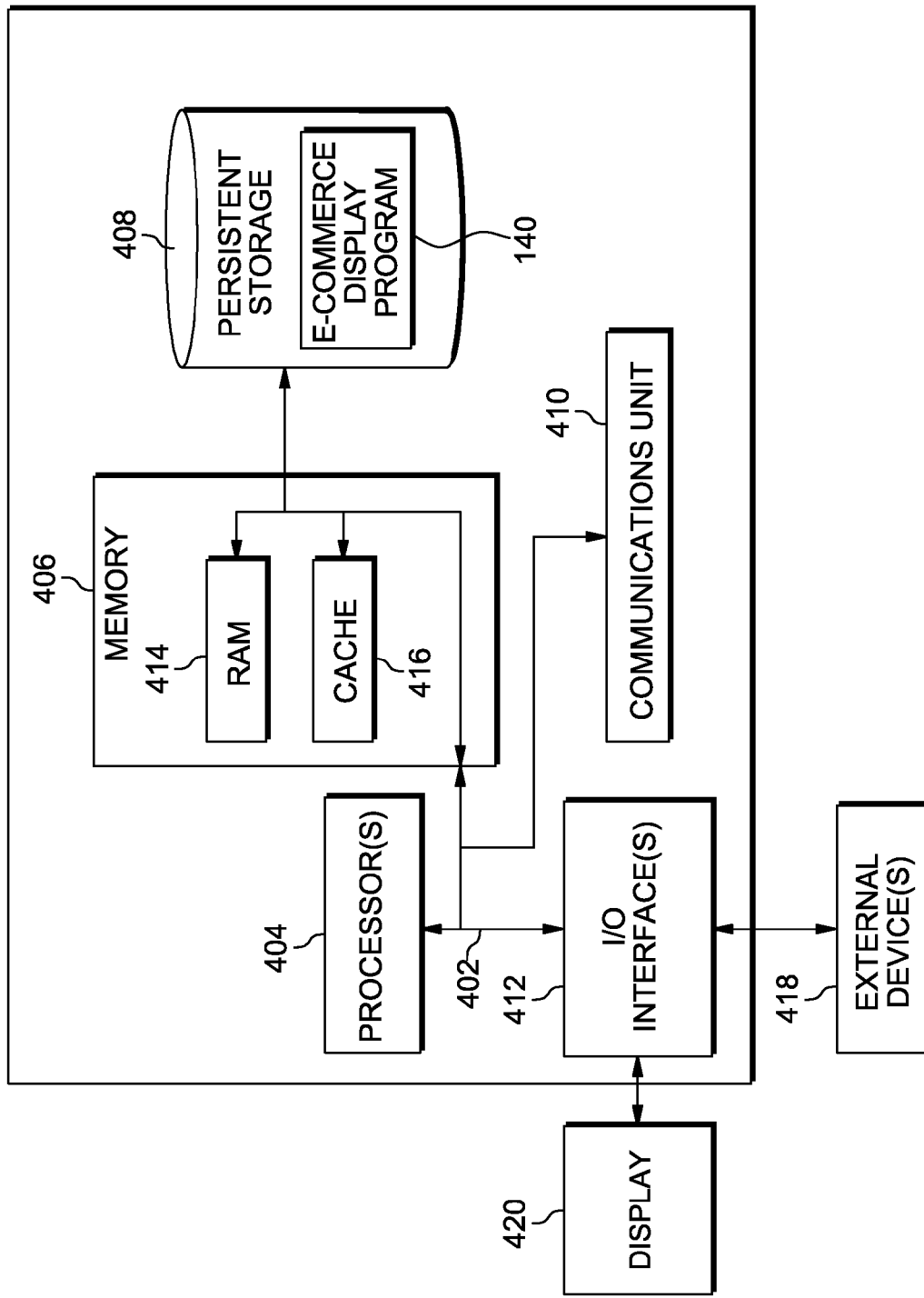
FIG. 4 depicts a block diagram of components of the computing devices, and the server computer executing the e-commerce display program, in accordance with an embodiment of the present invention.

In various embodiments of the present invention, computing device 110, computing device 120, and server computer 150 can be servers, laptop computers, tablet computers, netbook computers, personal computers (PCs), desktop computers, personal digital assistants (PDAs), smart phones, or any programmable electronic device capable of communication via network 130. In other exemplary embodiments, computing device 110, computing device 120, and server computer 150 represent computing systems utilizing clustered computers and components to act as a single pool of seamless resources. In general, computing device 110 and computing device 120 are computing devices that allow users to access the functions and attributes of server computer 150. In general, server computer 150 can be any computing device or a combination of devices with access to e-commerce display program 140, integration platform 142, profiles 144, and analytics 146, and is capable of executing e-commerce display program 140. Computing device 110, computing device 120, and server computer 150 may include internal and external hardware components, as depicted and described in further detail with respect to FIG. 4.

In an exemplary embodiment, as users browse, buy, indicate approval of (e.g., a "like" on Facebook™), or write reviews and recommendations for various items, e-commerce display program 140 collects data from e-commerce platforms such as Travelocity™ and Amazon.com™. E-commerce data includes, but is not limited to, pre and post purchase data, such as "likes"/Tweets and reviews as well as browsing history for various users. In general, the data is collected by a social commerce integration bus, an integration platform herein referred to as integration platform 142, and analytic algorithms are applied to the data. The data is then presented to a user using a faceted display as an integrated element of a social network site.

The faceted display is included within a social network site, such as Facebook™ and is in general dedicated to displaying the current and historical e-commerce activities of a given user. The faceted display includes timeline(s) associated to a given user. In general, there are two types of timelines which can be displayed, namely, a social activities time line, and an e-commerce activities timeline for social network members. The timelines are populated with activities of the user and social network members, included in the timeline, as chosen by the user. Typically, the social network members would include close friends, relatives, or individuals that the user trusts. In some embodiments, select e-commerce activity of specific individuals, such as friends and family members, can be included in the e-commerce activity timeline(s) of a given user. In general, a friend, relative, or individual whom the user trusts is herein referred to as a recipient. Typically, a recipient is someone who can view some or all of the information included in the timeline(s) of the user and can share their own timeline data with the user.

In an exemplary embodiment, integration platform 142 identifies and collects the various data elements that are to be stored in profiles 144. Typically, these data elements are specifically associated to a known, i.e., registered, user of e-commerce display program 140 (for further details see the discussion of analytics 146 below). Integration platform 142 identifies when a user is actively participating in e-commerce related activities, such as browsing or chatting with recipients about a specific product. In general, integration platform 142 identifies e-commerce related activities through the log-on of registered users or through the identification of specific product information, such as the inclusion of a link to a product in a chat session.

In an exemplary embodiment, user information is stored as profiles 144. In general, the user information includes user identifying information, user browsing information, user product recommendations, user purchase information, and links to information concerning recommended products. Typically, at least some of the user information is displayed on the faceted display of a social network site along with links to product information. In general, if a product recommendation is created by the user, then the product recommendation is associated with the timeline of the user which can then be viewed by recipients (e.g., relatives) designated by the user. Often, the recipients are chosen from a list of "friends" of the user, family members, or those individuals that the user trusts but can also include individuals with access to the social network site.

In various embodiments, profiles 144 information pertaining to a user, includes information and data such as noting that the user visited a particular web site, downloaded music, watched a video, or engaged in gaming activities, is used to enrich the time lines associated with that user. An example of one such embodiment would be to collect data on music, movie and other entertainment preferences as computing device 110 plays or downloads various entertainments. Embodiments of the invention also allow for consumer clients to list items they want to buy, which are then listed on the timeline(s) of the user.

In an exemplary embodiment, analytics 146 includes analytical algorithm(s) that e-commerce display program 140 uses to analyze the data identified and collected by integration platform 142. The algorithm(s) stored as analytics 146 can include algorithms for e-commerce analytics that analyze online browsing, purchase, recommendation information etc., web analytics that analyze page views, page downloads etc., text analytics that analyze and decipher recommendations, bad experiences etc., entity analytics that authenticate end user and end user specific data, affinity analytics that identify who to display specific information to, and sentiment analytics that identify and decipher emotional content included in recommendations and experiences.

The aforementioned analytic algorithms can be applied to a given user's e-commerce activity data, e.g., items that have been added or removed from an online virtual shopping cart, purchasing, recommending, etc., to create a faceted time line based display within the end users social network platform. In general, analytic algorithms can be applied to validate the data, authenticate users, relate online e-commerce data to a given user, classify e-commerce data by product and service categories, classify e-commerce data by end user behavior such as actual purchase, purchase intent, or creation of a product recommendation, classify ecommerce data by target of purchased items, i.e., self use or used for gift giving, decipher positive and negative comments about products and services, and determine who should get which piece of information regarding a given user's e-commerce data.

The identified, collected and analyzed data can then be tailored and displayed by e-commerce display program 140. In general, a user is given the option to either share or not share purchase information with one or more members of their social network via the faceted display. Friends and relatives, as selected by the user, can choose to view a particular facet of the timeline(s) of the user with regard to their own online shopping behavior. For example, a user buys a new album of their favorite band. A recipient sees the purchase, on the timeline of the user, and also purchases the new album.

In some embodiments, if e-commerce display program 140 receives e-commerce data, i.e., the identified, collected and analyzed data, such as a product recommendation, then e-commerce display program 140 notifies the recommending user, by updating their timeline(s) with the relevant data. The relevant data can include information such as when the recommendation was created and when a selected recipient has viewed the recommendation. In certain embodiments, e-commerce display program 140 can update the timeline(s) of a user when a recommended product is purchased by a selected recipient that viewed the recommendation. In addition, in some embodiments, a user may also select specific recipients to receive an additional notification, when the recipient views the recommendation. For example, the timeline(s) of a first user includes a web page for a product recommended by the user, e.g., a hairdryer, and uniform resource locators (URLs) that link to product information. The first user also includes an additional message for a second user indicating that the product is being purchased as a gift for a third user. The second user receives the message, after checking the recommendation left by the first user, and knows that they should not buy a hairdryer for the third user.

Figure 2:
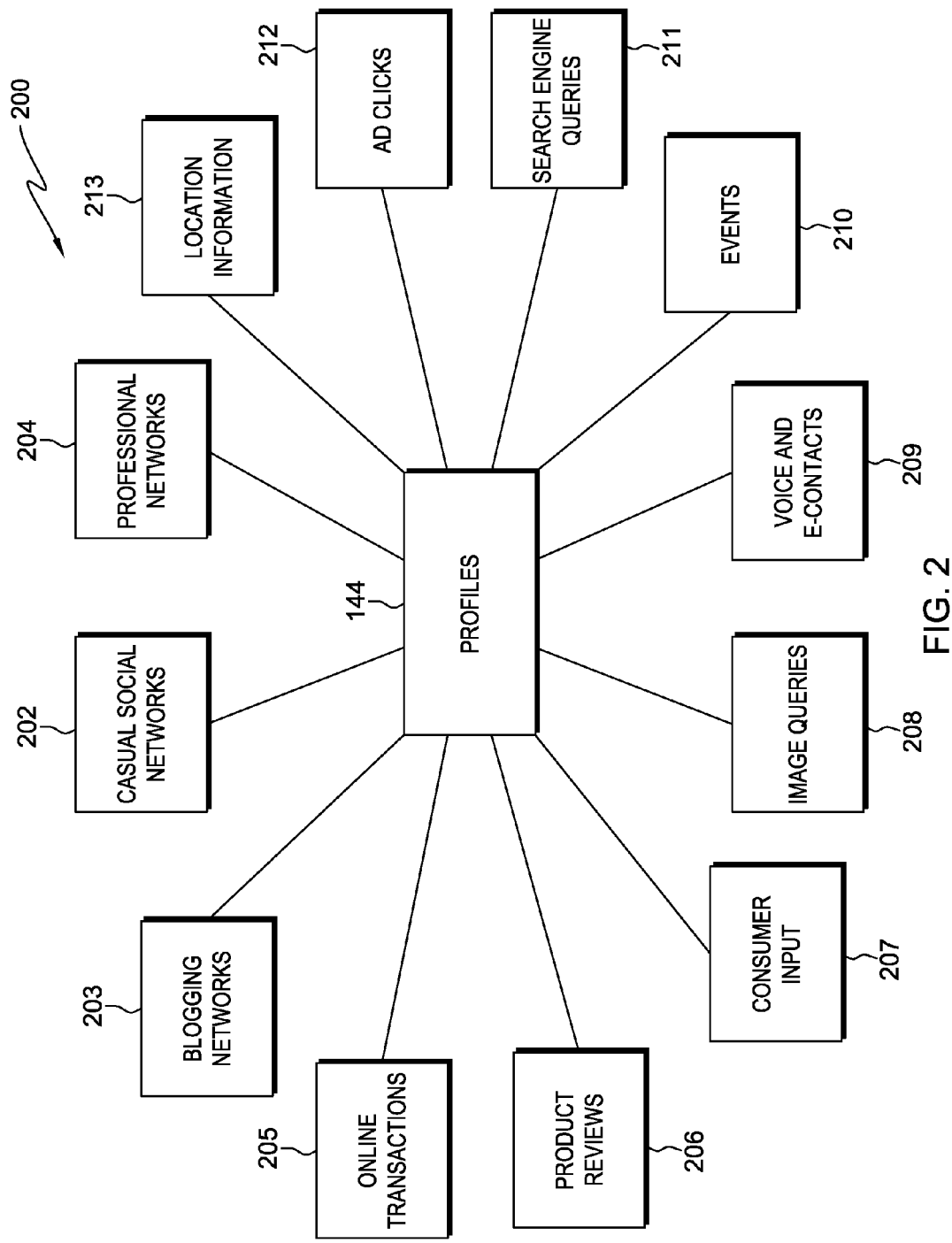
FIG. 2 is a schematic illustrating inputs to a user profile, in accordance with an embodiment of the present invention.

In an exemplary embodiment, there can be a single recipient or a group of recipients. For example, the user may have previously designated certain recipients who communicate via casual social networks 202, as depicted in FIG. 2, as "friends". In this exemplary embodiment, the "friends" of the user are typically persons known by the user or are trusted "friends" of the user's "friends". In general, a "friend" or other type of recipient can communicate with the user using computing device 120 via network 130. The list of recipients, associated with a given user, are included in profiles 144. Thus, server computer 150 can function as a host server of the social network shopping community.

In an exemplary embodiment, a user can make a recommendation of a product and the information regarding the recommendation is then included in the respective timeline(s) of the user. For example, a user posts a link to information concerning a product on a virtual wall, e-commerce display program 140 identifies the post as being created by the user and includes that information in the timeline(s) of the user. In another example, a product recommendation is sent by email to two recipients simultaneously. E-commerce display program 140 identifies the product recommendation in the email as being created by the user as well as the email recipients, and includes that information in the timeline(s) of the user. In yet another example, a user is participating in a chat session, regarding a specific product, via an instant messaging service hosted by server computer 150. The user sends a link to product information to the one or more chatting recipients via the instant messaging service. E-commerce display program 140 identifies the link in the chat session as being created by the user as well as the chatting recipients, and includes that information in the timeline(s) of the user.

In an alternative embodiment, a user can invite and take a group of recipients on a virtual shopping tour. When a recipient receives the invitation, the recipient may select a link that opens a window on the recipient's computer monitor that displays one or more virtual store fronts and one or more product categories of products sold by each store. The user may control the tour by selecting a particular store front, in response to which the user and recipients are virtually taken inside the store. For example, a window may open on the display of computing device 110 for the user as well as the recipients' display (i.e., the display of computing device 120) to display products sold by the store. The user may then recommend a displayed product and may also solicit and receive comments concerning the product or store from one or more recipients on the shopping tour. The date, time, participants, and products viewed (including the respective comments and recommendations for each product viewed) are all included in the respective timelines of the user and the group of recipients that participated in the virtual shopping tour. Subsequent to the tour, if e-commerce display program 140 determines that the user, or someone the group of recipients, that participated in the virtual shopping tour has purchased a viewed product, then e-commerce display program 140 updates the respective timelines of the user and the group of recipients that participated in the virtual shopping tour with that information.

In some embodiments, a user can solicit a recommendation of a product from a select group of recipients. In general, a user selects a product category for which he or she seeks a recommendation. For example, a list of product categories from which to choose is displayed, e.g., "furniture polishes." The user selects the respective category to seek a recommendation of a product in the selected category. Upon receipt of the category selection of the user, e-commerce display program 140 searches profiles 144 for recommendations of products in that product category. If e-commerce display program 140 identifies a relevant recommendation, e.g., one that matches the product category, then that recommendation is passed to, for example, computing device 110. E-commerce display program 140 then updates the timeline(s) of the user to include data reflecting the search for the recommendation as well as the identity of the recipient who made the recommendation. In other embodiments, if a user retrieves a recommendation, then the timeline(s) of the recipient who made that recommendation are updated to show that the user has accessed their recommendation. Similarly, in another embodiment, a user seeking feedback can submit the image of an item they are seeking more information about. E-commerce display program 140 can then solicit fresh feedback from recipient with appropriate profiles, stored in profiles 144, and deliver the returned responses or reviews to the user. Again, as discussed in the previous examples and embodiments, the activity of a user seeking feedback and those who provided feedback would be recorded, and their respective timeline(s) would be updated accordingly.

In some embodiments, e-commerce display program 140 can solicit feedback from users using simple queries and, using that feedback, can generate a more detailed product review. At certain time intervals new queries can be sent to reviewers to allow for updates thereby creating consumer reviews which are dynamically updated over the lifecycle of the product. For example, a consumer buys an computer tablet and provides a product review that provides feedback using e-commerce display program 140. Three months later, e-commerce display program 140 queries the user to update their previously supplied feedback, and then repeatedly queries the user every six months until the user indicates the product is no longer used. In certain embodiments, these queries can be consolidated to generate simple surveys that cover multiple product reviews, which are then displayed to users who supplied or solicited feedback.

In an exemplary embodiment, FIG. 2 is schematic illustrating inputs to profiles 144, according to an exemplary embodiment. Profiles 144 is dynamic in that it is continuously updated over time by both passive and active participation via user activities. In general, all events and/or information included in profiles 144 have a relevance date tag. The relevance date tag is used to place a given event and/or information, of a respective user, on the timeline of the user.

In exemplary embodiments, active user input begins when the user installs and activates the e-commerce display program 140. In an exemplary embodiment, basic information is obtained such as client demographics, user likes and dislikes, professional interests, leisure activities and hobbies, products they have and use, and products they desire. In an alternative embodiment, a given user is regularly queried for additional bits of up to date information. This input can be obtained by regularly sending short polls via email. An example of such a query would be a short questionnaire including questions such as what type of mobile phone or PDA a client uses and/or likes, and if they plan to upgrade. If they do plan to upgrade further questions could be posed such as, what brand and model would they prefer, do they have a mobile broadband plan, are they happy with their carrier, do they get dropped calls, and the like.

In order to ascertain that certain data is current, in some embodiments, e-commerce display program 140 periodically questions the user with short surveys to prompt the corresponding client to verify if information is current, or to change outdated information. In various embodiments the user can select security settings, options to include location data and register mobile devices, and even options to receive direct solicitations form retailer clients, etc. In some embodiments, the user can access e-commerce display program 140 to actively update information and settings stored in profiles 144 at any time.

Certain embodiments also provide for passive updating of the information and settings stored in profiles 144. In an exemplary embodiment, as the user progresses with networking activities e-commerce display program 140 identifies casual social networks 202, professional networks 204, and blogging networks 203 frequented by the user, and inputs the aforementioned information into the corresponding profiles 144. Examples of such networks are Facebook™, MySpace™, Linkedin™, Twitter™, Google™, etc. E-commerce display 140 also identifies search engine queries 211 conducted by, and Internet sites visited by, a given user, and updates profiles 144 dynamically as to the corresponding interests and networks indicated thereby. In an alternative embodiment, e-commerce display program 140 identifies other enrolled users within casual social networks 202, blogging networks 203, and professional networks 204. In yet another alternative embodiment, e-commerce display program 140 solicits non-enrolled "friends" or "followers" in a user's social network for reviews and/or recommendations for a given item or service. In a further alternative embodiment, e-commerce display program 140 can include applications that interface directly with social networking sites 202, 203, and 204. Similarly, user contacts such as voice, e-mail or instant messaging contacts (voice and e-contacts 209) could be solicited for enrollment. In certain embodiments, electronic devices, such as cell phones, can send a signal that indicates the location of the user, i.e., location information 213, to e-commerce display program 140. Location information 213 can be useful for locating an item of interest later. For example, if a user notes a particular item that they like in a large store or mall.

The use of location information can be combined with image queries 208. Image queries 208 are search records related to images of interest to the user. For example, a user in a mall takes a picture of an item they wish to purchase later using their cell phone. The user uploads the picture to e-commerce display program 140 and includes the image in their timeline along with a request for a product review. E-commerce display program 140, notes the request for a product review as product reviews 206 and sends out a request for reviews of the product. In general product reviews 206 includes product reviews requested and written by a given user.

In an exemplary embodiment, online transactions 205 of a user triggers the collection of new real time data delivery to update the corresponding profiles 144. Information on purchases such as specific items purchased, price paid, retailer information, reviews/opinions posted by the user, etc are automatically collected. The aforementioned information is included as part of profiles 144. In an alternative embodiment, such new information triggers requests for a detailed product review or query of a particular product, or asking for new consumer input 207 at a later time or times, which further enriches profiles 144. Participation of a given user in selling or auction platforms such as, for example, Ebay™ or Amazon™ is noted by various embodiments and the respective products listed or purchased as well as the transactions made on such platforms by a given user can trigger automatic updates to profiles 144. In short, the various retailer(s) a user does business with are recorded as part of profiles 144, making it possible for e-commerce display program 140 to identify and solicit feedback from the user and the recipients of the user. An exemplary embodiment provides the user the option to adjust the settings of e-commerce display program 140 and/or opt out of certain data mining functions at any time.

Various event 210 data may, in some embodiments, trigger a consumer profile update. For example, a consumer's response to certain ads may trigger an update to profiles 144 in various embodiments. In an example, when a user clicks on an ad, activating a link included in the add, i.e., ad clicks 212, potential interest in that product or service is noted in profiles 144 data associated with the user. In some embodiments, e-commerce display 140 detects if a video ad was played through, or if an ad was activated, for example, by clicking on the add. E-commerce display 140 updates profiles 144 according to the detected activity. The activation/clicking of an ad is herein considered an event 210, which results in new data being collected and stored in profiles 144. For example, a computing device 110, such as a laptop or an iPad™, may be used regularly at certain times by a user for specific program activities. In this example, both the time of day the computing device 110 is used and the program category, such as a media player, or genre, e.g., a type of music played, are noted and respective profiles 144 data associated with that user is updated. For example, a registered user, using computing device 120, routinely watches a certain football highlights program at 8 PM Monday through Friday. Profiles 144 is updated with data that tags both the interest in football highlights and the time of day the user is routinely using computing device 110.

In certain exemplary embodiments, users are allowed to control the degree of privacy maintained by e-commerce display program 140. Specifically, users are permitted to specify that specific information about them is maintained as private. Users can also specify what recipients, being organized by individuals, organizations, companies, or groups that have access to more detailed information about the user. In general, users are allowed to identify specific types of information, for example phone numbers, addresses, preferences, products owned or desired, demographic segments, recent activities, and the like, and to specify what level of privacy is to be maintained by e-commerce display program 140 for each specific type (or even for each specific piece of information, as illustrated for example by providing different privacy settings for a mobile phone used socially and a business phone used only professionally).

It is to be appreciated by one having ordinary skill in the art that there are many ways in which a system according to the invention could carry out the aforementioned privacy function. For example, an application programming interface (API) according to the invention could be used to allow for a third party online service to provide e-commerce display program 140 a plurality of sets of electing user id, information type id, information instance id, other user or group id, and a privacy setting describing the privacy to be maintained when disclosing information about the electing user to the other user or group concerning a particular information instance or information type. This exemplary embodiment further includes an optional provision of a default setting such that users who wish to bypass setting security rules are still protected in a default fashion. Additionally, preconfigured "security bundles" may be provided according to exemplary embodiments of the present invention to facilitate rapidly setting up typical security profiles by the user.

In another embodiment, e-commerce display program 140 may directly offer a configuration page to users that allows them, among other things, to specify their privacy settings in any desired level of detail. E-commerce display program 140 is thus enabled to act as a trusted middleman or information intermediary, and thus to make it possible for users to enjoy greater value from online services without having to sacrifice their privacy. In other words, the capacity of e-commerce display program 140 to store information about millions of users' product holdings, product experiences, future product purchase plans, and online shopping behavior, to name a small set of the possible types of information handled by e-commerce display program 140 and stored as profiles 144 data, as discussed above. E-commerce display program 140 uses the previously mentioned information to update the timeline(s) for individuals and groups, from among the millions of users. E-commerce display program 140 further uses the profiles and timeline(s) to provide valuable information to the same and other users, while protecting the personal information of each of the individual users according to rules established by each respective user.

Figure 3:
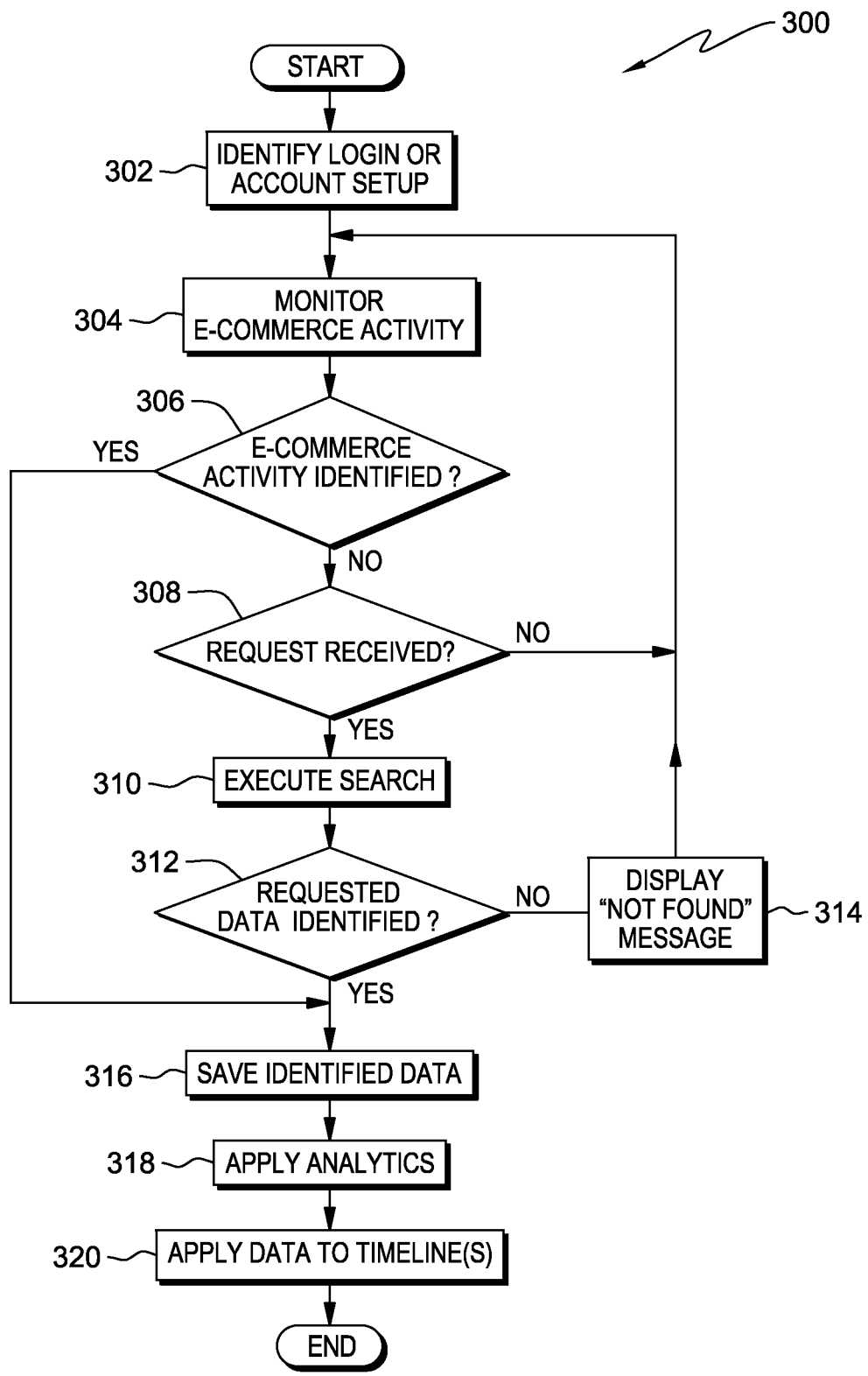
FIG. 3 illustrates operational steps of an e-commerce display program, operating on a server computer within the electronic commerce environment of FIG. 1, in accordance with an embodiment of the present invention.

In reference to FIG. 3, a flow chart 300 illustrating the operational steps an e-commerce display program follows to gather e-commerce data and update the timeline(s) associated with a given user, in accordance to an exemplary embodiment.

In an exemplary embodiment, e-commerce display program 140 identifies the log-in of a registered user or the creation of an account, i.e., the creation of a registered user, in step 302. The log-in is detected through the matching of user identifying information, entered using computing device 110, to user data stored in profiles 144. The respective profile information of the identified user is then loaded.

In step 304, e-commerce display program 140 uses integration platform 142 to actively monitor the e-commerce activity of the logged in user, using computing device 110, as well as specified other user(s) (i.e., logged-in user(s) using computing device 120). For example, the logged in user, using computing device 110, has specified in their profile settings that they want their timeline(s) updated using the e-commerce activity of specified recipients as well as their own e-commerce activity. So, when the user logs in, e-commerce display program 140 identifies any specified recipients who are also logged in and, using integration platform 142, begins monitoring the e-commerce activity of the user and the specific recipients.

If e-commerce activity is identified by e-commerce display program 140 (decision step 306, yes branch), then that information, i.e., the identified data, is saved to profiles 144 in step 316. If no e-commerce activity is identified (decision step 306, no branch), then e-commerce display program 140 determines if the user, or their friends, has submitted a request for e-commerce information (decision step 308).

If no request has been received for e-commerce information (decision step 308, no branch), then e-commerce display program 140 returns to active monitoring of e-commerce activity (step 304). However, if a request has been received for e-commerce information (decision step 308, yes branch), then e-commerce display program 140 executes a search for the requested information in step 310. For example, the user of computing device 110 desires a review of a sweater they wish to purchase for their mother's birthday. The user submits the request for a review of the sweater. E-commerce display program 140 analyzes the data stored in profiles 144, using the analytic algorithms stored in analytics 146, and identifies a recipient of the user who has written several reviews of sweaters in the past. Therefore, e-commerce display program 140 determines that the recipient of the user is a good match for providing a recommendation. E-commerce display program 140 sends a prompt to the recipient, who is using computing device 120, requesting a recommendation regarding the sweater. In another example, e-commerce display program 140 searches the timelines of the user's recipients and identifies a number of reviews and recommendations regarding sweaters. In yet another example, e-commerce display program 140 searches the internet for reviews and recommendations regarding sweaters.

If the requested information is not identified (decision step 312, no branch), then e-commerce display program 140, sends a message indicating that the requested information was not found, step 314, and returns to active monitoring of e-commerce activity (step 304). If the requested information is identified (decision step 312, yes branch), then that information, i.e., the identified data, is saved to profiles 144 in step 316.

In step 318 of this exemplary embodiment, e-commerce display program 140 applies the analytic algorithms, stored in analytics 146, to the data that has been saved in step 316. This is generally a filtering and quality control process to help ensure that only the most relevant data is returned to a given user. For example, in continuation of the sweater examples discussed above, the analytics identify two online reviews, one for a red wool sweater and another for a purple cotton sweater, and a recommendation from a recipient of the user. The profile data for the user's mother, who is also a registered user, indicates that she hates the color red and is allergic to cotton. As a result, the analytic algorithms reject the review for red wool sweater and the purple cotton sweater, but accepts a recommendation from the user's recipient for a purple cashmere sweater.

The data, relevant to the user, is applied by e-commerce display program 140 to the timeline(s) of the user. E-commerce display program 140 also associates the appropriate privacy settings to the applied data as dictated by the users profile, in step 320. In other words, e-commerce display program 140 associates authorization information to the data so that the authorization to view the data is controlled by the privacy settings of the user. For example, in continuation of the sweater example above, the recipients and family of the user can view the request and received recommendation for the purple cashmere sweater, but the user's mother would be excluded from such information. If the user chooses to purchase the purple cashmere sweater then information regarding the purchase would also be available to the recipients and family who would then know not to purchase the same gift for the mother.

Computing device 110, computing device 120, and server computer 150 include respective sets of, communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

E-commerce display program 140, integration platform 142, profiles 144, and analytics 146 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computing device 110, computing device 120, and server computer 150. In these examples, communications unit 410 includes one or more network interface cards. Communications unit 410 may provide communications through the use of either or both physical and wireless communications links. E-commerce display program 140, integration platform 142, profiles 144, and analytics 146 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., e-commerce display program 140, integration platform 142, profiles 144, and analytics 146 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of to generating a customized electronic commerce display included in a social network platform, the method comprising:
   generating, by a first computer, visually perceptible elements for a social network platform that includes information from a trusted source by:
   the first computer monitoring collected data from one or more network platforms for data indicating electronic commerce activity of a first user;
   the first computer identifying specific data from within the collected data corresponding to one or more electronic commerce activities related to the first user;
   the first computer retrieving a first data, wherein the first data is coupled to the electronic commerce activity;
   the first computer generating a second data, wherein the second data is generated by:
   analyzing the first data;
   identifying and retrieving one or both of an online recommendation and an online review of a product that were authored by the first user and that are associated with the electronic commerce activity, wherein the second data reflects, at least in part, results of an analysis of the first data and includes, at least in part, one or both of the online recommendation and the online review of the product that were authored by the first user;
   the first computer generating at least one timeline of electronic commerce activity of the first user based, at least in part, on the second data;
   the first computer adding a visually perceptible element to a display for a social network platform of the first user that includes an electronic commerce display that includes i) the at least one timeline of the electronic commerce activity of the first user and ii) at least a portion of the second data;
   storing, in a profile of the first user, a setting of the first user;
   storing, in a profile of a second user, a setting indicating that i) the first user is a trusted source of information, and ii) that the portion of the second data included in the electronic commerce display of the first user is to be added to a timeline of the second user;
   the first computer accessing a setting of the social network platform of the first user;
   the first computer determining, based on the setting of the social network platform of the first user, that a second user has permission to view a portion of the second data included in the electronic commerce display of the first user;
   the first computer determining, based on the setting of the social network platform of the second user, that i) the first user is a trusted source of information, and ii) that the portion of the second data included in the electronic commerce display of the first user is to be added to a timeline of the second user; and
   the first computer adding a visually perceptible element to a display for a social network platform of the second user that includes an electronic commerce display that includes the portion of the second data as part of a timeline of the second user in response to:
   a) a determination that the second user has permission to add the portion of the second data as part of the visually perceptible element, and,
   b) the determinations that i) the first user is a trusted source of information, and ii) that the portion of the second data included in the electronic commerce display of the first user is to be added to timeline of the second user.

2. The method of claim 1, wherein the timeline of the electronic commerce activity of the first user further comprises electronic commerce activity related to a second user.

3. The method of claim 1, further comprising the steps of the first computer receiving a request from a third user to view and access the electronic commerce display of the first user;
   the first computer determining if the third user has authorization to view the electronic commerce display of the first user, wherein access of the electronic commerce display by the third user is controlled by privacy or security settings, which are selected by the first user; and
   responsive to the determination, by the first computer, that the third user does have authorization, the first computer providing the third user with access to the electronic commerce display of the first user in accordance to privacy or security settings selected by the first user.

4. The method of claim 3, wherein privacy or security settings, which are selected by the first user, allow access to a portion of the electronic commerce display of the first user.

5. The method of claim 3, further comprising the steps of:
   responsive to the determination, by the first computer, that the third user does have authorization to view the electronic commerce display of the first user, the first computer sending to the third user a message indicating a restriction in access.

6. The method of claim 1, wherein the electronic commerce activity includes one or more of pre and post purchase data, items that have been added or removed from a virtual shopping cart, items that have been purchased, reviews or recommendations that are written, requested or viewed by the first user, and a browsing history of the first user.

7. The method of claim 1, wherein analyzing the first data to generate the second data comprises:
   authenticating the first data;
   identifying, by the first computer, a user to whom the second data is to be displayed;
   filtering, by the first computer, e-commerce activity included in an e-commerce activity timeline;
   deciphering, by the first computer, positive and negative recommendations or experiences relating to the e-commerce activity;
   analyzing, by the first computer, at least one of online browsing, purchases, recommendations, web page views, web page downloads, and text; and
   generating the second data based on the analysis of the first data such that the second data reflects, at least in part, results of the analysis of the first data.

8. The method of claim 1, wherein the step of the first computer identifying electronic commerce activity related to a first user further comprises the steps of:
   the computer identifying at least one source of electronic commerce activity; and
   the computer aggregating at least one identified source of electronic commerce activity.

9. A computer program product for generating a customized electronic commerce display included in a social network platform, the computer program product comprising:
   one or more computer-readable storage media and program instructions stored on the one or more computer-readable storage media, the program instructions comprising:
      program instructions to generate visually perceptible elements for a social network platform that includes information from a trusted source by executing:
         program instructions to monitor collected data from one or more network platforms for data indicating electronic commerce activity of a first user;
         program instructions to identify specific data from within the collected data corresponding to one or more electronic commerce activities related to the first user;
         program instructions to retrieve a first data, wherein the first data is coupled to the electronic commerce activity;
         program instructions to generate a second data, a second data, wherein the second data is generated by:
            analyzing the first data;
            identifying and retrieving one or both of an online recommendation and an online review of a product that were authored by the first user and that are associated with the electronic commerce activity, wherein the second data reflects, at least in part, results of an analysis of the first data and includes, at least in part, one or both of the online recommendation and the online review of the product that were authored by the first user;
         program instructions to generate at least one timeline of electronic commerce activity of the first user based, at least in part, on the second data;
         program instructions to add a visually perceptible element to a display for a social network platform of the first user that includes an electronic commerce display that includes i) the at least one timeline of the electronic commerce activity of the first user and ii) at least a portion of the second data;
         program instructions to store, in a profile of the first user, a setting of the first user;
         program instructions to store, in a profile of a second user, a setting indicating that i) the first user is a trusted source of information, and ii) that the portion of the second data included in the electronic commerce display of the first user is to be added to a timeline of the second user;
         program instructions to access a setting of the social network platform of the first user;
         program instructions to determine, based on the setting of the social network platform of the first user, that a second user has permission to view at least a portion of the electronic commerce display of the first user;
         program instructions to determine, based on the setting of the social network platform of the second user, that i) the first user is a trusted source of information, and ii) that the portion of the second data included in the electronic commerce display of the first user is to be added to a timeline of the second user; and
         program instructions to add a visually perceptible element to a display for a social network platform of the second user that includes an electronic commerce display that includes the portion of the second data as part of a timeline of the second user in response to:
            a) a determination that the second user has permission to add the portion of the second data as part of the visually perceptible element, and
            b) the determinations that i) the first user is a trusted source of information, and ii) that the portion of the second data included in the electronic commerce display of the first user is to be added to timeline of the second user.

10. The computer program product of claim 9, wherein the timeline of the electronic commerce activity of the first user further comprises electronic commerce activity related to a second user.

11. (The computer program product of claim 9, further comprising:
   program instructions to receive a request from a third user to view and access the electronic commerce display of the first user;
   program instructions to determine if the third user has authorization to view the electronic commerce display of the first user, wherein access of the electronic commerce display by the third user is controlled by privacy or security settings, which are selected by the first user; and
   program instructions to, responsive to the determination that the third user does have authorization, provide the third user with access to the electronic commerce display of the first user, according to privacy or security settings selected by the first user.

12. The computer program product of claim 11, wherein privacy or security settings, which are selected by the first user, allow access to a portion of the electronic commerce display of the first user.

13. The computer program product of claim 11, further comprising the steps of:
   responsive to the determination, by the first computer, that the third user does have authorization to view the electronic commerce display of the first user, the first computer sending to the third user a message indicating a restriction in access.

14. The computer program product of claim 9, wherein the electronic commerce activity includes one or more of pre and post purchase data, items that have been added or removed from a virtual shopping cart, items that have been purchased, reviews or recommendations that are written, requested or viewed by the first user, and a browsing history of the first user.

15. The computer program product of claim 9, wherein analyzing the first data to generate the second data comprises executing:
program instructions to authenticate the first data;
program instructions to identify a user to whom the second data is to be displayed;
program instructions to filter e-commerce activity included in an e-commerce activity timeline;
program instructions to decipher positive and negative recommendations or experiences relating to the e-commerce activity;
program instructions to analyze at least one of online browsing, purchases, recommendations, web page views, web page downloads, and text; and
program instructions to generate the second data based on the analysis of the first data such that the second data reflects, at least in part, results of the analysis of the first data.

16. The computer program product of claim 9, wherein the program instructions to identify electronic commerce activity related to a first user further comprise:
program instructions to identify at least one source of electronic commerce activity; and
program instructions to consolidate the identified electronic commerce activity.

17. A computer system for generating a customized electronic commerce display included in a social network platform, the computer system comprising:
one or more computer processors;
one or more computer-readable storage media;
program instructions stored on the computer-readable storage media for execution by at least one of the one or more processors, the program instructions comprising:
program instructions to generate visually perceptible elements for a social network platform that includes information from a trusted source by executing:
program instructions to monitor collected data from one or more network platforms for data indicating electronic commerce activity of a first user;
program instructions to identify a specific data from within the collected data corresponding to one or more electronic commerce activities related to the first user;
program instructions to retrieve a first data, wherein the first data is coupled to the electronic commerce activity;
program instructions to generate a second data, a second data, wherein the second data is generated by;
analyzing the first data;
identifying and retrieving one or both of an online recommendation and an online review of a product that were authored by the first user and that are associated with the electronic commerce activity, wherein the second data reflects, at least in part, results of an analysis of the first data and includes, at least in part, one or both of the online recommendation and the online review of the product that were authored by the first user;
program instructions to generate at least one timeline of electronic commerce activity of the first user based, at least in part, on the second data;
program instructions to add a visually perceptible element to a display for a social network platform of the first user that includes an electronic commerce display that includes i) the at least one timeline of the electronic commerce activity of the first user and ii) at least a portion of the second data;
program instructions to store, in a profile of the first user, a setting of the first user;
program instructions to store, in a profile of a second user, a setting indicating that i) the first user is a trusted source of information, and ii) that the portion of the second data included in the electronic commerce display of the first user is to be added to a timeline of the second user;
program instructions to access a setting of the social network platform of the first user;
program instructions to determine, based on the setting of the social network platform of the first user, that a second user has permission to view at least a portion of the electronic commerce display of the first user;
program instructions to determine, based on the setting of the social network platform of the second user, that i) the first user is a trusted source of information, and ii) that the portion of the second data included in the electronic commerce display of the first user is to be added to a timeline of the second user; and
program instructions to add a visually perceptible element to a display for a social network platform of the second user that includes an electronic commerce display that includes the portion of the second data as part of a timeline of the second user in response to:
a) a determination that the second user has permission to add the portion of the second data as part of the visually perceptible element, and,
b) the determinations that i) the first user is a trusted source of information, and ii) that the portion of the second data included in the electronic commerce display of the first user is to be added to timeline of the second user.

18. The computer system of claim 17, further comprising:
program instructions to receive a request from a third user to view and access the electronic commerce display of the first user;
program instructions to determine if the third user has authorization to view the electronic commerce display of the first user, wherein access of the electronic commerce display by the third user is controlled by privacy or security settings, which are selected by the first user; and
program instructions to, responsive to the determination that the third user does have authorization, provide the third user with access to the electronic commerce display of the first user, according to privacy or security settings selected by the first user.

19. The computer system of claim 18, wherein privacy or security settings, which are selected by the first user, allow access to a portion of the electronic commerce display of the first user.

20. The computer system of claim 18, further comprising the steps of:
responsive to the determination, by the first computer, that the third user does have authorization to view the electronic commerce display of the first user, the first computer sending to the third user a message indicating a restriction in access.

21. The computer system of claim 17, wherein the electronic commerce activity includes one or more of pre and post purchase data, items that have been added or removed from a virtual shopping cart, items that have been purchased, reviews or recommendations that are written, requested or viewed by the first user, and a browsing history of the first user.

22. The computer system of claim 17, wherein analyzing the first data to generate the second data comprises executing:
   program instructions to authenticate the first data;
   program instructions to identify a user to whom the second data is to be displayed;
   program instructions to filter e-commerce activity included in an e-commerce activity timeline;
   program instructions to decipher positive and negative recommendations or experiences relating to the e-commerce activity;
   program instructions to analyze at least one of online browsing, purchases, recommendations, web page views, web page downloads, and text; and
   program instructions to generate the second data based on the analysis of the first data such that the second data reflects, at least in part, results of the analysis of the first data.

23. The computer system of claim 17, wherein the program instructions to identify electronic commerce activity related to a first user further comprise:
   program instructions to identify at least one source of electronic commerce activity; and
   program instructions to consolidate the identified electronic commerce activity.

* * * * *